(12) United States Patent
Ding et al.

(10) Patent No.: US 9,719,663 B2
(45) Date of Patent: Aug. 1, 2017

(54) ILLUMINATING DEVICE AND PROJECTOR

(71) Applicant: OSRAM GmbH, Munich (DE)

(72) Inventors: Yi Ding, Kunshan Jiangsu (CN); Ulrich Hartwig, Berlin (DE)

(73) Assignee: OSRAM GMBH, Munich (DE)

( * ) Notice: Subject to any disclaimer, the term of this patent is extended or adjusted under 35 U.S.C. 154(b) by 397 days.

(21) Appl. No.: 14/381,607

(22) PCT Filed: Mar. 26, 2013

(86) PCT No.: PCT/EP2013/056408
§ 371 (c)(1),
(2) Date: Aug. 28, 2014

(87) PCT Pub. No.: WO2013/149888
PCT Pub. Date: Oct. 10, 2013

(65) Prior Publication Data
US 2015/0043242 A1    Feb. 12, 2015

(30) Foreign Application Priority Data

Apr. 1, 2012  (CN) .......................... 2012 1 0096624

(51) Int. Cl.
*F21V 13/08*    (2006.01)
*G03B 21/20*    (2006.01)
(Continued)

(52) U.S. Cl.
CPC ............ *F21V 13/08* (2013.01); *F21V 7/0025* (2013.01); *F21V 7/08* (2013.01); *F21V 9/08* (2013.01);
(Continued)

(58) Field of Classification Search
CPC ... F21V 13/08; F21V 9/08; F21V 7/08; F21V 7/0025; G02B 27/102; G02B 6/0096; G02B 6/00; G03B 21/2033
See application file for complete search history.

(56) References Cited

U.S. PATENT DOCUMENTS

2004/0062044 A1*  4/2004  Hanano ............. G02B 27/0927
                                                                 362/317
2011/0317131 A1   12/2011  Miyazaki

FOREIGN PATENT DOCUMENTS

CN          1608228 A      4/2005
CN       101852337 A      10/2010
(Continued)

OTHER PUBLICATIONS

International Search Report issued in PCT/EP2013/056408 issued on Jul. 8, 2013.
(Continued)

*Primary Examiner* — David V Bruce
(74) *Attorney, Agent, or Firm* — Viering, Jentschura & Partner mbB (57) ABSTRACT

An illuminating device may include a light source, an optical unit configured to adjust direction of light from the light source, a reflector, a light pipe, and an exciter. The light pipe may receive light having a first wavelength from the optical unit and direct the light having the first wavelength onto the exciter. The exciter may convert the light having the first wavelength into light having the second wavelength and reflects the light having the second wavelength to the reflector. A circumferential wall of the light pipe is configured to reflect the light having the first wavelength and to transmit the light having the second wavelength.

20 Claims, 8 Drawing Sheets

(51) Int. Cl.
  *F21V 7/00* (2006.01)
  *G02B 6/00* (2006.01)
  *F21V 7/08* (2006.01)
  *F21V 9/08* (2006.01)
  *G02B 27/10* (2006.01)
  *F21W 131/406* (2006.01)
  *F21V 8/00* (2006.01)
  *F21Y 101/00* (2016.01)
  *F21Y 115/30* (2016.01)

(52) U.S. Cl.
  CPC ............. *G02B 6/00* (2013.01); *G02B 6/0096* (2013.01); *G02B 27/102* (2013.01); *G03B 21/2033* (2013.01); *F21W 2131/406* (2013.01); *F21Y 2101/00* (2013.01); *F21Y 2115/30* (2016.08); *G02B 6/003* (2013.01)

(56) References Cited

FOREIGN PATENT DOCUMENTS

| | | |
|---|---|---|
| CN | 102393597 A | 3/2012 |
| EP | 2355524 A1 | 8/2011 |
| EP | 2518560 A1 | 10/2012 |
| WO | 03034145 A1 | 4/2003 |
| WO | 2005107420 A2 | 11/2005 |
| WO | 2009112961 A1 | 9/2009 |

OTHER PUBLICATIONS

Chinese Search Report based on application No. 2012100966249 (1 page) dated Sep. 15, 2015 (Reference Purpose Only).

\* cited by examiner

ILLUMINATING DEVICE AND PROJECTOR

RELATED APPLICATIONS

The present application is a national stage entry according to 35 U.S.C. §371 of PCT application No.: PCT/EP2013/056408 filed on Mar. 26, 2013, which claims priority from Chinese application No.: 201210096624.9 filed on Apr. 1, 2012, and is incorporated herein by reference in its entirety.

TECHNICAL FIELD

Various embodiments relate to an illuminating device and a projector.

BACKGROUND

As the laser light source (for example, laser diode (LD)) has the characteristics of good monochromaticity, strong directivity and high luminance, the more attention is paid to the LD illuminating device and the LD illuminating device is used in various environments (e.g. medical devices, automobile headlamps, night vision monitoring, stage illumination and the like). Compared with a light-emitting diode (LED) illuminating device, the LD illuminating device has a longer illumination distance and a longer service lifetime.

Figure 1:
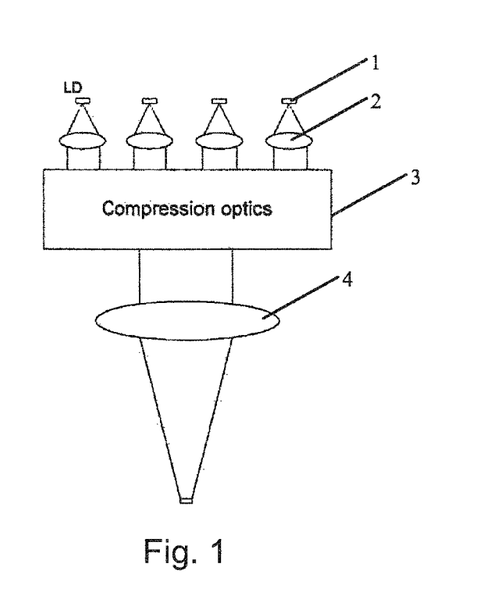
FIG. 1 and FIG. 2 show prior illuminating devices, wherein light paths in an ideal situation and in an actual situation are shown, respectively.
Figure 2:
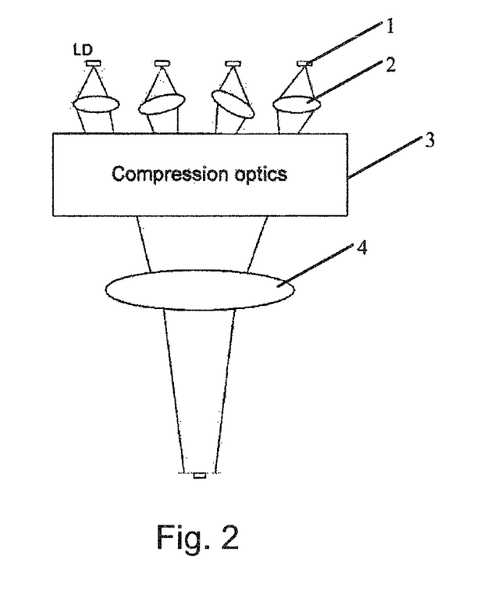

In the related art, such LD illuminating device usually includes a laser diode array configured to generate laser beams; collimating lenses respectively corresponding to the laser diodes of the laser diode array and configured to collimate laser beams emitted from corresponding laser diodes; compression optics configured to reduce intervals between parallel laser beams emitted from respective collimating lenses; and a focus lens configured to converge light emitted from the compression optics. Ideally, the collimating lenses can collimate the laser beams into parallel light, and then the parallel light is focused on a desired location after compressed and converged, as shown in FIG. 1. However, practically as shown in FIG. 2, due to tolerance in practical manufacturing and decentering and tiling in assembling of the collimating lenses, light emitted from the collimating lenses is not parallel, thereby a light spot emitted from the focus lens will have the following problems, for instance, the light spot is expanded and deviated from a desired location (as shown by an arrow in FIG. 2), and thus, the light efficiency of the LD illuminating device is caused to be reduced.

SUMMARY

Various embodiments provide an illuminating device, with which the low light efficiency problem of the above illuminating device can be solved, and light beams having a desirable wavelength can be obtained.

The illuminating device according to various embodiments may include a light source, an optical unit configured to adjust direction of light from the light source and a reflector, characterized in that the illuminating device further includes a light pipe and an exciter, the light pipe receives light having a first wavelength from the optical unit and projects the light having the first wavelength onto the exciter, the exciter converts the light having the first wavelength into light having the second wavelength and reflects the light having the second wavelength to the reflector, wherein circumferential wall of the light pipe is configured to reflect the light having the first wavelength and to transmit the light having the second wavelength.

Various embodiments may improve the illuminating device by additionally providing a light pipe, whose circumferential wall is configured to reflect the light having the first wavelength and to transmit the light having the second wavelength. Various embodiments propose the light pipe, whose circumferential wall is configured to reflect the light having the first wavelength and to transmit the light having the second wavelength, other than a normal light pipe that reflects light having all wavelengths. As for the normal light pipe in the related art, for example, when the light pipe is provided in one reflector, after the blue laser is directed on exciter and converted into yellow light beams, the yellow light beams is reflected and scattered by the exciter, and the reflected and scattered yellow light is incident to the inner side of the light pipe and is also reflected by the light pipe, so that the yellow light finally leaves the reflector at one end of the reflector that receives the blue laser, thus the whole illuminating device could not work. Various embodiments propose the light pipe whose circumferential wall has dichromaticity, so that for example the yellow light beams will be directly transmitted through the circumferential wall without influence on the operate of the illuminating device.

Secondly, the light pipe can solve the problems of the illuminating device that the light utilization efficiency is reduced as the focus light spot is expanded or deviated from a desired location caused by tolerance in practical manufacturing and decentering and tiling in assembling of the collimating lenses, and thus, an allowable tolerance of the collimating lenses of the illuminating device is increased, and light having a desirable wavelength can be provided according to requirements.

In various embodiments, the light pipe is tapered. When the light pipe is tapered with a certain conical degree, one end of the light pipe having a relatively larger size is preferably used to receive light from the optical unit, thus a accepting area for receiving converged light beams can be increased, so that the focus light spot still can enter the light pipe even in a situation that the focus light spot is deviated from the focus position a certain distance or the focus light spot is expanded, and thus, the allowable deviation of the collimating lenses of the illuminating device can be improved.

In various embodiments, an inner side of the circumferential wall of the light pipe is coated with a dichromic coating, or the circumferential wall of the light pipe is a dichromic mirror. Besides, the dichromic coating includes, for instance, hydrophilic polymer film of a dichromic pigment, e.g., PVA film, locally formalized PVA film and ethylene-vinyl acetate copolymer local saponification film. The dichromic mirror can be any of the known dichromic mirrors which are applicable.

In various embodiments, the reflector is an ellipse reflector. The ellipse reflector is capable of reflecting light from a first focus thereof to a second focus thereof so that converged light beams can be obtained at the second focus of the ellipse reflector. By obtaining the converged light beams at the focus of the ellipse reflector, the illuminating light beams can have a small divergence angle so that the light efficiency of the illuminating device can be improved. In various embodiments, the reflector is a reflector with an opening, and the opening is configured in such a manner that the light pipe is at least partially inserted into the reflector through the opening. By using the reflector having the opening, the light pipe and the reflector can be assembled by at least partially inserting the light pipe into the reflector so as to reduce the volume of the illuminating device. The advantage of the designation of the present disclosure is more apparent especially in a way that an exit end of the light pipe configured to reflect the light having the first wavelength and to transmit the light having the second wavelength is provided in the reflector.

In various embodiments, the light pipe may include a first end and a second end, wherein the second end has a size smaller than that of the first end, and the light pipe is at least partially inserted into the ellipse reflector by the second end. The light having the first wavelength is collectedly emitted from the light pipe by at least partially inserting the second end of the light pipe into the ellipse reflector.

In various embodiments, an optical axis of the light pipe passes through the focus of the reflector. With such configuration, the light efficiency of the illuminating device can be improved, because if the optical axis of the light pipe is deviated from the focus, a part of light cannot be projected onto the exciter, thus resulting in a reduced light efficiency.

In various embodiments, the exciter is provided in the first focus position of the ellipse reflector, so as to enable light reflected from the exciter onto the ellipse reflector to be focused on the second focus position of the ellipse reflector, thereby forming collect beams.

In various embodiments, a distance between the exciter and the second end of the light pipe preferably is 0.5 mm-1.0 mm so that more uniform and more light can illuminate upon the exciter and the exciter is prevented from being quenched by the laser light beams, and the light efficiency of the illuminating device is improved. In addition, for example, when the light pipe is preferably 20 mm, whereby light enters the light pipe and will be reflected and superposed several times in the light pipe to enable light emitted from the light pipe to have a uniform luminance distribution, so that the exciter can be further prevented from being quenched, and the service lifetime of the exciter thereby is prolonged, and the light efficiency of the illuminating device is further improved.

In various embodiments, the optical unit may include collimating lenses, compression optics and a focus lens provided in sequence on light path. The optical unit configured in such a manner can adjust light beams emitted from the light source to have a relatively small light spot, so that the light efficiency of the illuminating device is improved.

In various embodiments, the ellipse reflector is a hollow ellipse reflector. When the ellipse reflector is a hollow ellipse reflector, the light pipe is at least partially inserted into the hollow ellipse reflector through an opening of the hollow ellipse reflector, so that the illuminating device becomes compact and miniaturized.

In various embodiments, a reflective layer is coated on an end surface of the second end of the light pipe. The reflective layer coated on the end surface can reflect that part of light beams incident upon the end surface, thus preventing TIR phenomenon of that part of light beams incident upon the end surface within the circumferential wall of the light pipe, and that part of light beams can be re-utilized. Specifically, that part of light beams incident upon the end surface includes light having the first wavelength and light having the second wavelength. In a situation that the light having the first wavelength is reflected, the conversion efficiency of the exciter can be improved; and in a situation that the light having the second wavelength is reflected, the light collecting efficiency of the reflector can be improved. Therefore, the light efficiency of the illuminating device can be further improved on the whole. Besides, the reflective layer can be a normal reflective film of visible light wavelength.

In various embodiments, the ellipse reflector may include a first portion and a second portion, wherein the first portion and the second portion are assembled with each other to define a cavity for inserting the light pipe. Assembling the two portions to define the cavity for inserting the light pipe also can miniaturize the illuminating device. Moreover, another advantage of such configuration is easy processing and manufacturing.

In various embodiments, inner surfaces and outer surfaces of the first portion and the second portion are configured to reflect the light having the second wavelength and to transmit the light having the first wavelength. With such configuration, TIR phenomenon within the circumferential wall of the light pipe can be avoided while the above effects are realized, so that there is no need to coat a reflective layer on the end surface of the second end of the light pipe.

In various embodiments, the light pipe has a length of 20 mm so as to realize uniform light distribution as light is reflected and superposed several times in the light pipe. Besides, the dimension of the light pipe depends upon several factors, for instance, a half width R at entrance of the light pipe is determined by tolerance of the device, and values generally taken should allow an assembling error of 0.1 mm of the collimating lenses; a half width r at an exit of the light pipe is determined by taking efficiency of the exciter, quenching and aperture size at the second focus of the ellipse reflector into consideration, wherein the aperture size at the second focus of the ellipse reflector is determined according to practical requirements; the length of the light pipe depends upon the dimension of the ellipse reflector, while the latter is decided as demanded by the device.

In various embodiments, the light pipe has quadrangular truncated cone, and the light pipe includes four wall portions assembled together, and the wall portions jointly form the circumferential wall of the light pipe. With such configuration, the light spot emitted from the illuminating device can have a quadrilateral shape and thus can be used in a system that needs quadrilateral light beams, e.g. for illuminating a digital micromirror device (DMD) in a DLP projector.

In various embodiments, the light pipe is a circular truncated cone, and the light pipe includes two semicylindrical wall portions assembled together, and the wall portions jointly form the circumferential wall of the light pipe. With such configuration, the light spot emitted from the illuminating device can have a circular shape, and thus the illuminating device can be used in an environment that needs circular light beams.

In various embodiments, the exciter may include a plurality of regions, each of which has the different excitation properties, that is, is excited by the light having the first wavelength to generate excited light of different color, including, e.g. red light, blue light, green light, yellow light. Therefore, the wavelength of light beams emitted from the illuminating device can be adjusted.

In various embodiments, the exciter is a phosphor. The phosphor can be red phosphor made from a $YBO_3$:Eu material, green phosphor made from a $ZnSiO_4$:Mn material, blue phosphor made from a barium magnesium aluminate material doped with $Eu^{2+}$ ions, and yellow phosphor made from YAG.

Various embodiments further provide a projector, including the illuminating device above, and light emitted from said illuminating device can directly enter another light pipe of the projector and then projects onto a digital micromirror device. Since light reflected by the reflector can be focused at the second focus location, the light efficiency can be improved.

Further, the term "exciter" used herein refers to such a substance which is illuminated by incident light having a certain wavelength (ultraviolet radiation or visible light) and absorbs photo energy to be in excited state, and then transits into ground state or low excited state to emit light having different wavelength from that of the incident light. The representation substance of exciter is the emitting material which uses the rare earth compound as ground substance and rare earth elements as exciting agent, includes but is not limited to phosphor.

In various embodiments, the problem of low light efficiency of the above illuminating device can be solved, and light beams having a desirable wavelength can be obtained.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

The following detailed description refers to the accompanying drawing that show, by way of illustration, specific details and embodiments in which the disclosure may be practiced.

Figure 3:
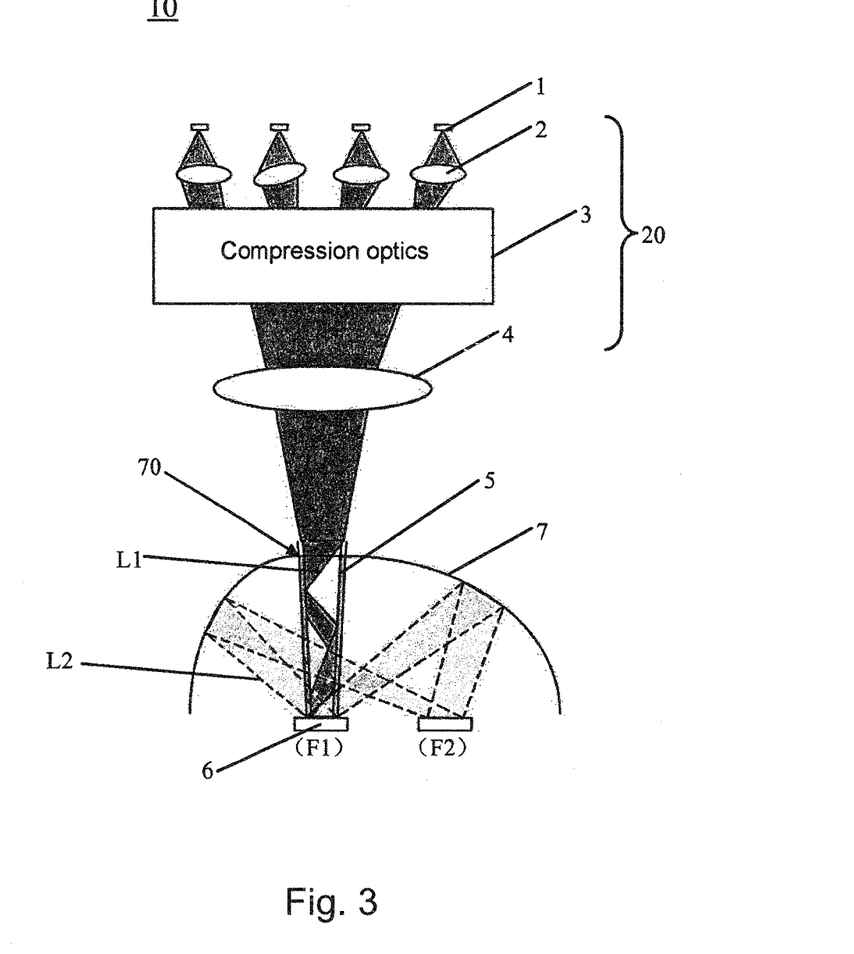
FIG. 3 is a schematic diagram of a first embodiment of an illuminating device according to the present disclosure.

FIG. 3 is a schematic diagram of a first embodiment of an illuminating device 10 according to the present disclosure. The illuminating device 10 according to the present disclosure includes a light source 1, a plurality of collimating lenses 2, compression optics 3, a focus lens 4, a tapered light pipe 5, a phosphor 6 and an ellipse reflector 7 with an opening 70, wherein the light source 1 is a laser diode array including a plurality of laser diodes and emits, for instance, blue laser; the plurality of collimating lenses 2 are corresponding to the plurality of laser diodes of the light source 1, respectively, and configured to collimate blue laser from corresponding laser diode into parallel light; the compression optics 3 is configured to reduce intervals between parallel blue laser beams emitted from respective collimating lenses 2; the focus lens 4 is configured to converge the blue laser beams emitted from the compression optics 3; the tapered light pipe 5 is configured to receive the blue laser beams from the focus lens 4; the phosphor 6 is configured to convert the blue laser beams emitted from the tapered light pipe 5 into yellow light beams and to reflect the yellow light beams; and the phosphor 6 is provided in the first focus position (e.g. F1) of the ellipse reflector 7, and the ellipse reflector 7 is configured to reflect the yellow light beams reflected by the phosphor 6 to a second focus position (e.g. F2). In addition, the tapered light pipe 5 is partially inserted into the ellipse reflector 7, and an optical axis of light in the tapered light pipe 5 passes through the first focus position (F1) of the ellipse reflector 7 where the phosphor 6 is located and can be perpendicular to or form a certain angle with the phosphor 6 located at the focus F1.

Figure 4:
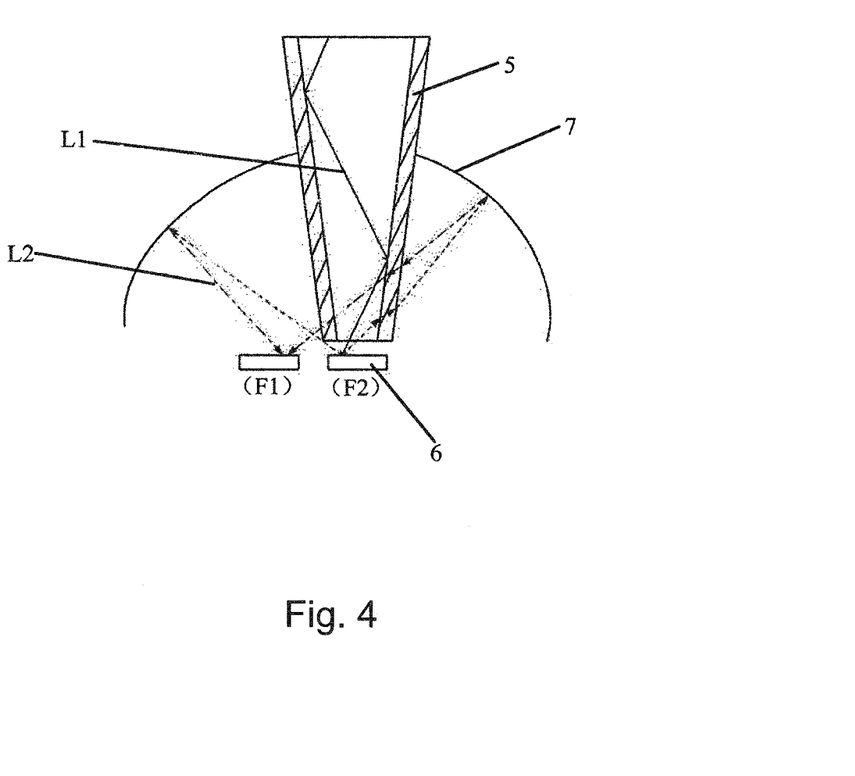
FIG. 4 is a schematic diagram of light paths in a light pipe and in a reflector shown in FIG. 3.

In order to enable the illuminating device to operate well, a circumferential wall of the tapered light pipe 5 is configured to reflect blue light beams and to transmit the yellow light beams, as shown in FIG. 4, wherein solid lines L1 represent light paths of the blue light beams in the tapered light pipe 5, and broken lines L2 represent light paths of the yellow light beams.

As shown in FIG. 3, due to tolerance in practical manufacturing and the decentering and tilting in assembling of the collimating lens 2, the blue laser emitted from the collimating lens 2 is not parallel light, thus a light spot emitted from the focus lens 4 will be caused to be deviated and expanded (as shown in FIG. 2). By providing the tapered light pipe 5 and using one end thereof having a relative larger size to receive light from the focus lens 4, a accepting area of the converged laser beams is increased, so that the deviated light spot and expanded light spot also can be received, and as a result, the light efficiency of the illuminating device is improved.

Besides, as shown in FIG. 4, FIG. 4 is the schematic diagram showing light paths in the tapered light pipe 5 and in the ellipse reflector 7, the blue laser beams (solid lines L1) going into the tapered light pipe 5 are reflected and superposed several times in the tapered light pipe 5, and then exit from the tapered light pipe 5 onto the phosphor 6. The blue laser beams striking on the phosphor 6 are converted by the phosphor 6 into yellow light beams (broken lines L2), and the yellow light beams are scattered and reflected by the phosphor 6 onto the ellipse reflector 7, and then the ellipse reflector 7 reflects the yellow light beams L2 to the second focus position F2 of the ellipse reflector 7 and exit from the focus F2.

Since the blue laser beams L1 are reflected and superposed several times in the tapered light pipe 5, the laser beams projecting from the tapered light pipe 5 onto the phosphor 6 are in a uniform distribution, and thus the phosphor 6 quenching by the laser beams can be prevented. Specifically, when the tapered light pipe has a length of 20 mm, a maximum illuminance on a focus plane is 99 W/mm$^2$ when the laser beams enter the light pipe, and 10.6 W/mm$^2$ when the laser beams exit from the light pipe.

Besides, reference is still made to FIG. 3. Since the tapered light pipe 5 is inserted into the ellipse reflector 7, the illuminating device 10 is thus enabled to be compact and miniaturized. Specifically, when the tapered light pipe 5 has a length of about 20 mm and it is not inserted into the ellipse reflector 7, a total length of the illuminating device including other optical system for imaging on the phosphor 6 is longer than 100 mm, and when the tapered light pipe 5 is inserted into the ellipse reflector 7, the illuminating device 10 can become more compact.

Figure 5:
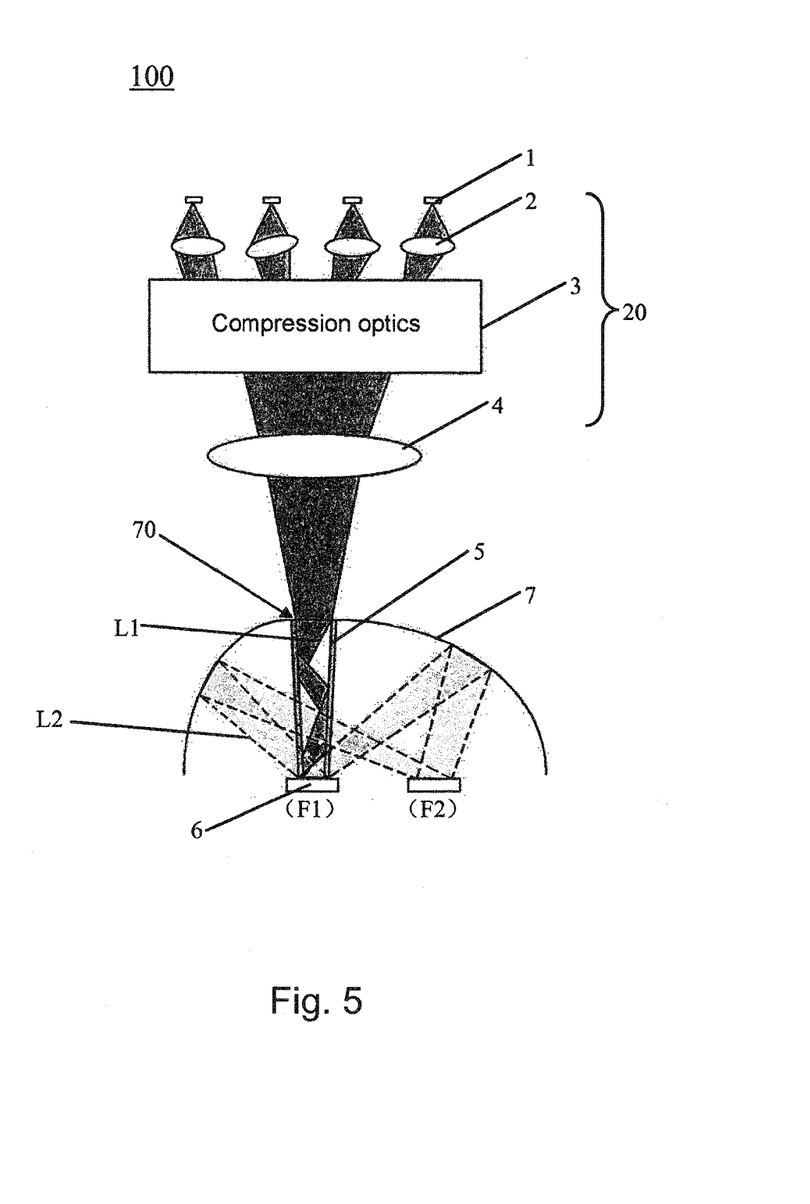
FIG. 5 is a schematic diagram of a second embodiment of an illuminating device according to the present disclosure.

FIG. 5 is a schematic diagram of a second embodiment of an illuminating device according to the present disclosure. The second embodiment of the illuminating device 100 of the present disclosure is different from the first embodiment of the illuminating device 10 according to the present disclosure in that in the second embodiment, the tapered light pipe 5 is completely inserted into the ellipse reflector 7, such that the illuminating device 100 is further allowed to be compact and miniaturized.

Figure 6:
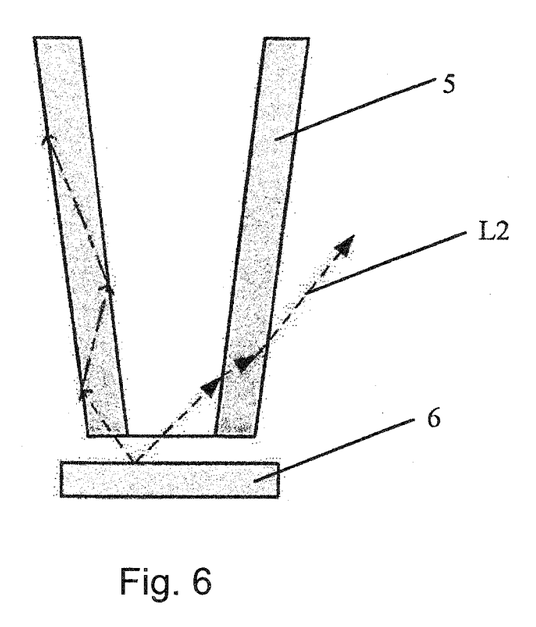
FIG. 6 shows a total internal reflection (TIR) effect generated within a circumferential wall of the light pipe.

FIG. 6 shows a total internal reflection (TIR) effect generated within the circumferential wall of the light pipe. As shown in FIG. 6, when a part of yellow light (as indicated by dot line) reflected and scattered by the phosphor 6 is incident upon inner side of the circumferential wall of the light pipe 5, since the circumferential wall of the light pipe 5 has a characteristics of making yellow light transmitted therethrough, this part of light transmits the circumferential wall of the light pipe 5 to be incident upon the reflector 7. However, another part of yellow light (as indicated by dash dot line) reflected from the phosphor 6 is incident upon an end surface of a lower end of the light pipe 5 and transmits therethrough to go into the circumferential wall of the light pipe 5, moreover, this part of yellow light will be totally internally reflected within the circumferential wall and tapped inside the circumferential wall, i.e. so-called total internal reflection effect phenomenon, thus, the light efficiency will be reduced.

Figure 7:
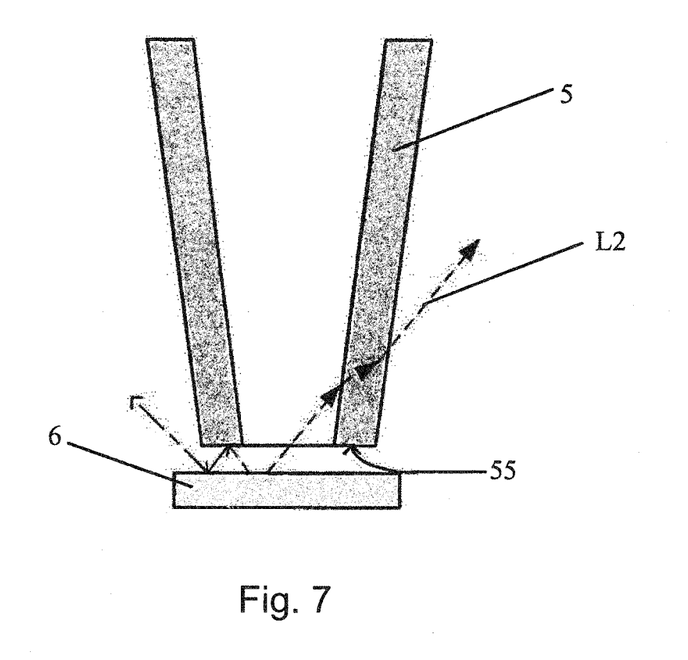
FIG. 7 is a schematic diagram of a third embodiment of an illuminating device according to the present invention for eliminating the total internal reflection effect as shown in FIG. 6.

In order to avoid the above problem, inventors of the present disclosure propose to coat a reflective layer on the end surface of the lower end of the light pipe 5, so that the yellow light beams incident upon the end surface are reflected back to the phosphor 6 instead of entering the circumferential wall of the light pipe 5, and the yellow light beams reflected back to the phosphor 6 are again reflected by the phosphor 6 to arrive at the ellipse reflector 7, as shown in FIG. 7. Besides, a small part of blue laser (not shown) will be reflected by the phosphor 6 onto the end surface so as to generate the total internal reflection effect, in which situation, due to provision of the reflective layer, that small part of blue laser reflected onto the end surface of the light pipe also will be reflected back to the phosphor 6, so that the conversion efficiency of the phosphor 6 is improved, and the light efficiency of the illuminating device is correspondingly improved.

FIG. 7 is a schematic diagram of a third embodiment of an illuminating device according to the present disclosure for eliminating the total internal reflection effect as shown in FIG. 6. The third embodiment of the illuminating device of the present disclosure is different from the second embodiment of the illuminating device 100 of the present disclosure in that a reflective layer 55 is coated on the end surface of the lower end of the light pipe 5. The reflective layer 55 can be a normal reflective film of visible light wavelength. With such configuration, occurrence of TIR effect can be avoided, and thus, this part of light still can be re-utilized, and the light efficiency of the illuminating device can be improved.

Figure 8:
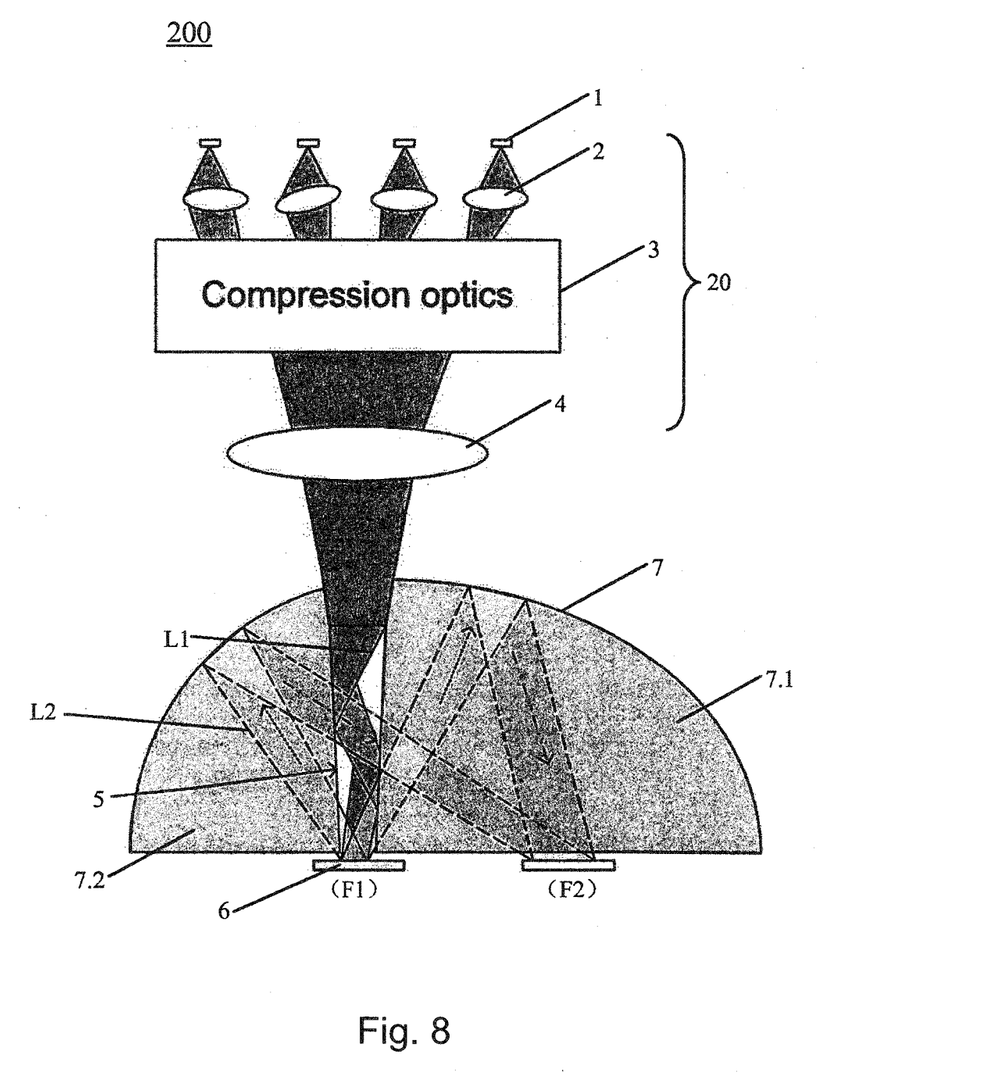
FIG. 8 is a schematic diagram of a fourth embodiment of an illuminating device according to the present disclosure.

FIG. 8 is a schematic diagram of a fourth embodiment of an illuminating device 200 according to the present disclosure. As shown in FIG. 8, the fourth embodiment of the illuminating device 200 of the present disclosure is different from the second embodiment of illuminating device 100 of the present disclosure in that in the fourth embodiment, the ellipse reflector 7 includes a first glass block 7.1 and a second glass block 7.2, and the first glass block 7.1 and the second glass block 7.2 are assembled with each other by, for instance, bonding through glue or mechanical fitment, to define a cavity for inserting the light pipe 5. In addition, inner surfaces and outer surfaces of the first glass block 7.1 and the second glass block 7.2 are coated with a coating that reflects yellow light beams and transmits blue light beams. In the present embodiment, as shown in FIG. 8, the blue laser beams transmit through the ellipse reflector 7 made of glass blocks to enter the tapered light pipe 5, and exit after reflected several times within the tapered light pipe 5. The blue laser beams exited from the tapered light pipe 5 are projected onto the phosphor 6, the blue laser beams projected on the phosphor 6 are converted by the phosphor 6 into yellow light beams, the yellow light beams are reflected by the phosphor 6 to the ellipse reflector 7, and then the yellow light beams are reflected by the ellipse reflector 7 onto the second focus position F2 of the ellipse reflector 7 and exit from the focus F2. As a result, the same effect as that of the second embodiment of the illuminating device according to the present disclosure can be realized. In addition, the TIR phenomenon (as shown in FIG. 6) also can be avoided in the fourth embodiment of the illuminating device according to the present disclosure, because the ellipse reflector 7 is made of glass blocks that can again reflect back that part of yellow light beams and the blue light beams reflected and scattered from the phosphor 6 to the phosphor 6, and thus, this part of blue light beams and yellow light beams can be re-utilized, which also can achieve the effect of improving the light efficiency of the illuminating device.

Further, in the above first to fourth embodiments, a better light collection efficiency also can be obtained at the second focus F2 of the ellipse reflector 7 by modifying and optimizing a curved surface of the ellipse reflector 7, thereby, the efficiency of the illuminating device is further improved.

The person skilled in the art should note that, though the blue laser beams and the yellow light beams are taken as examples in the first to fourth embodiments, that is, the blue laser diode array is used as the light source 1, and the yellow phosphor is used as the phosphor 6, the present disclosure is not limited to the above. The blue laser light beams and the yellow light beams also can be light of other colors, for example, the red laser diode array and the green laser diode array can be used as the light source 1 so that the red laser beams and the green laser beams can be instead of the blue laser beams, also the blue phosphor, the red phosphor or the green phosphor can be used as the phosphor 6 so that the blue light, the red light or the green light can be emitted instead of the yellow light, which can be changed according to practical requirements, and the configuration of light pipe can be adjusted accordingly. Similarly, though the ellipse reflector is taken as an example for description, the present disclosure is not limited to the same, and reflectors having other configurations, e.g. aspherical reflector and parabolic reflector, can be used.

For instance, in a situation that a parabolic reflector is used, light emitted from the reflector is parallel light, in this case, the illuminating device can be used for stage illumination, searchlight, etc.

Figure 9:
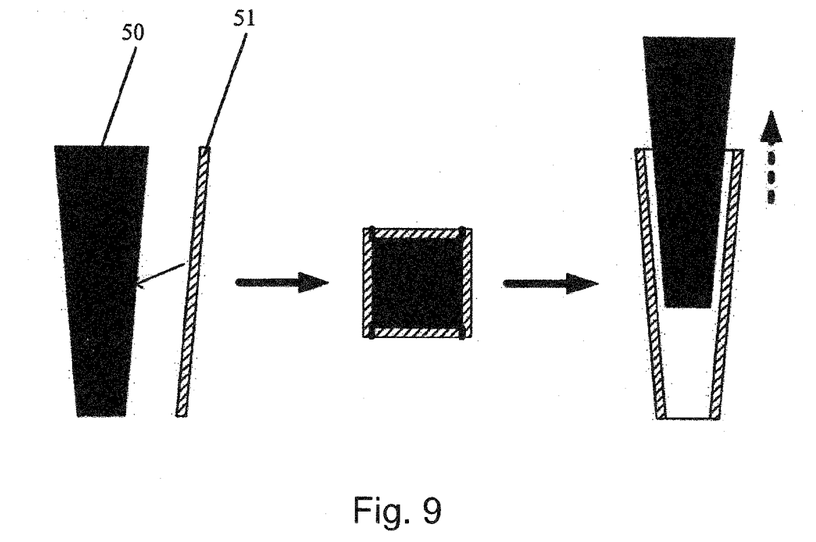
FIG. 9 is a schematic diagram of a method for manufacturing the light pipe of the illuminating device of the first to the fourth embodiments of the present disclosure.

FIG. 9 is a schematic diagram of a method for manufacturing the light pipe of the illuminating device of the first to the fourth embodiments of the present disclosure. As shown in FIG. 9, a schematic diagram of a method for manufacturing the light pipe is given by taking a quadrangular truncated cone light pipe as an example. Firstly, a quadrangular truncated cone solid rod 50 having a dimension substantially the same as that of the cavity of the light pipe is prepared, and then, four pieces of dichromic mirrors 51 are adhered to four sidewalls of the quadrilateral tapered solid rod by using an adhesive such as glue, so that the four dichromic mirrors 51 are assembled together, and thereafter, the quadrangular truncated cone solid rod 50 is removed so as to manufacture a quadrangular truncated cone light pipe 5.

The person ordinarily skilled in the art should understand that method for manufacturing the light pipe of the present disclosure is not limited to the above example, and other manufacturing methods are also feasible as long as the circumferential wall of the light pipe of the present disclosure is enabled to have the function of reflecting excited light such as blue laser beams and transmitting excited light such as yellow light beams. For instance, the light pipe of the present disclosure can be manufactured by using the manufacturing method as shown in FIG. 9 after four glass sheets are coated with a dichromic coating through an existing coating process. Alternately, in the present disclosure, a circular truncated cone light pipe can be formed by plating a dichromic coating on two semicylindrical glass sheets through an existing coating process and using a method similar to the manufacturing method as shown in FIG. 9.

Figure 10:
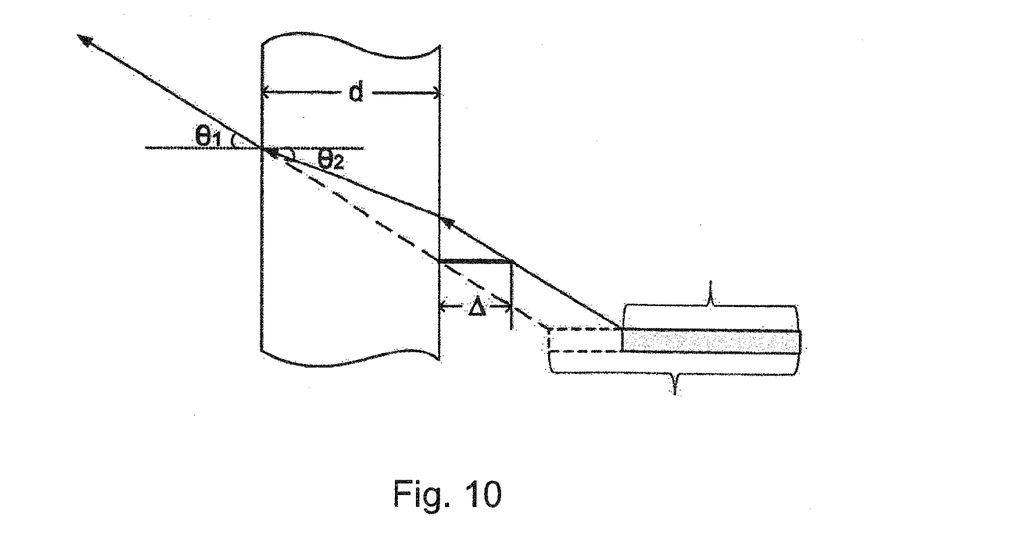
FIG. 10 is a schematic diagram of light deviation caused by wall thickness of the light pipe.
Figure 11:
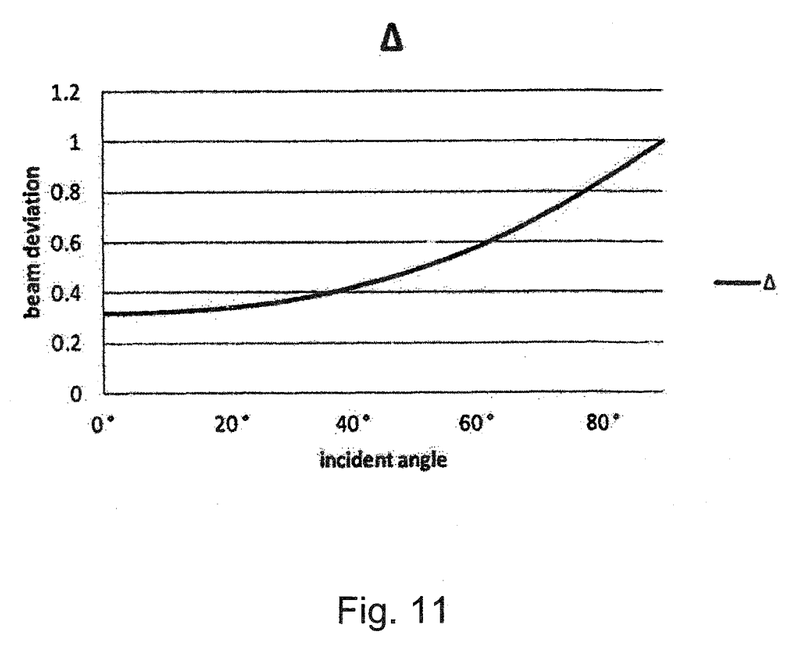
FIG. 11 is a diagram showing relation between light deviation and incident angle.

In addition, as for the light pipe, since the circumferential wall of the light pipe can reflect excited light such as blue laser beams and transmit excited light such as yellow light beams, the light pipe will not affect the function of the reflector. But the wall thickness of the light pipe will affect the light efficiency of the illuminating device 10. FIG. 10 is a schematic diagram of light deviation caused by wall thickness of the light pipe. As shown in FIG. 10, when light beams reflected from the phosphor are incident upon an inner wall of the light pipe, the light beams will be deviated to a certain degree when emerging from an outer wall of the light pipe due to influence of refraction. As shown in FIG. 11, the bigger the incident angle is, the more the deviation is, and a relation between deviation $\Delta$, wall thickness d of the light pipe, and angles $\theta_1$ and $\theta_2$ is $\Delta = d^x(1 - tg(\theta_2)/tg(\theta_1))$, according to which, it can be obtained that a maximum deviation $\Delta$ equals the wall thickness d of the light pipe. Such light deviation will cause the phosphor to appear bigger, for instance, as shown by the broken lines to the left of the phosphor in FIG. 10, thus, a bigger equivalent light spot will be generated at the focus F2, resulting a reduced light collecting efficiency of the ellipse reflector.

In addition, the phosphor in the above embodiments of the present disclosure can be made into a wheel shape and includes a plurality of regions each of which generates light having a different wavelength upon excitation, e.g. blue light, red light, green light and yellow light. In particular, the plurality of regions are the blue phosphor, the red phosphor and the green phosphor, respectively, so that the blue light, the red light and the green light can be emitted from the illuminating device. The illuminating device having such configuration can be used in a DLP projector.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. An illuminating device, comprising:
    a light source,
    an optical unit configured to adjust direction of light from the light source,
    a reflector,
    a light pipe, and
    an exciter,
    wherein the light pipe receives light having a first wavelength from the optical unit and direct the light having the first wavelength onto the exciter, the exciter converts the light having the first wavelength into light having the second wavelength and reflects the light having the second wavelength to the reflector, wherein a circumferential wall of the light pipe is configured to reflect the light having the first wavelength and to transmit the light having the second wavelength.

2. The illuminating device according to claim 1,
    wherein the light pipe is tapered.

3. The illuminating device according to claim 2,
    wherein an inner side of the circumferential wall of the light pipe is coated with a dichromic coating.

4. The illuminating device according to claim 2,
    wherein the circumferential wall of the light pipe is a dichromic mirror.

5. The illuminating device according to claim 1,
    wherein the reflector is an ellipse reflector.

6. The illuminating device according to claim 1,
    wherein the reflector is a reflector with an opening, and the opening is configured in such a manner that the light pipe is at least partially inserted into the reflector through the opening.

7. The illuminating device according to claim 6,
    wherein the light pipe comprises a first end and a second end, wherein the second end has a size smaller than that of the first end, and the light pipe is at least partially inserted into the ellipse reflector by the second end.

8. The illuminating device according to claim 1,
    wherein an optical axis of the light pipe passes through a focus of the reflector.

9. The illuminating device according to claim 7,
    wherein the light pipe receives, at the first end, the light having the first wavelength from the optical unit, and directs at the second end, the light having the first wavelength onto the exciter.

10. The illuminating device according to claim 5,
    wherein the exciter is provided at first focus of the ellipse reflector.

11. The illuminating device according to claim 6,
    wherein a distance between the exciter and the second end of the light pipe is 0.5 mm-1.0 mm.

12. The illuminating device according to claim 6,
    wherein the optical unit comprises collimating lenses, compression optics and a focus lens located in sequence on light path.

13. The illuminating device according to claim 5,
    wherein the ellipse reflector is a hollow ellipse reflector.

14. The illuminating device according to claim 13,
    wherein a reflective layer is coated on an end surface of the second end of the light pipe.

15. The illuminating device according to claim 5, wherein the ellipse reflector comprises a first portion and a second portion, wherein the first portion and the second portion are assembled with each other to define a cavity for inserting the light pipe.

16. The illuminating device according to claim 15, wherein inner surfaces and outer surfaces of the first portion and the second portion are configured to reflect the light having the second wavelength and to transmit the light having the first wavelength.

17. The illuminating device according to claim 2, wherein the light pipe is a quadrangular truncated cone, and the light pipe comprises four wall portions assembled together, and the wall portions jointly form the circumferential wall of the light pipe.

18. The illuminating device according to claim 2, wherein the light pipe is a circular truncated cone, and the light pipe comprises two semicylindrical wall portions assembled together, and the wall portions jointly form the circumferential wall of the light pipe.

19. The illuminating device according to claim 5, wherein the exciter comprises a plurality of areas having different excitation properties from each other.

20. The illuminating device according to claim 19, wherein the exciter is a phosphor.

* * * * *